US006965319B1

(12) United States Patent
Crichlow (10) Patent No.: US 6,965,319 B1
(45) Date of Patent: Nov. 15, 2005

(54) METHOD AND SYSTEM FOR ENERGY MANAGEMENT USING INTELLIGENT AGENTS OVER THE INTERNET

(76) Inventor: Henry Crichlow, 330 W. Gray St., suite 504, Norman, OK (US) 73069-7141

( * ) Notice: Subject to any disclaimer, the term of this patent is extended or adjusted under 35 U.S.C. 154(b) by 538 days.

(21) Appl. No.: 10/033,667

(22) Filed: Dec. 27, 2001

Related U.S. Application Data (60) Provisional application No. 60/141,529, filed on Jun. 25, 1999, provisional application No. 60/161,998, filed on Oct. 28, 1999, provisional application No. 60/258,634, filed on Dec. 29, 2000, provisional application No. 60/466,350, filed on Apr. 29, 2003, provisional application No. 60/469,484, filed on May 9, 2003.

(51) Int. Cl.[7] ............ G08B 23/00; G08C 15/06
(52) U.S. Cl. ............ 340/870.02; 340/870.07; 700/291; 702/62
(58) Field of Search ............ 340/870.02, 870.07; 700/291; 702/62

(56) References Cited

U.S. PATENT DOCUMENTS

| | | | | |
|---|---|---|---|---|
| 5,897,607 | A * | 4/1999 | Jenney et al. | 702/62 |
| 6,088,659 | A * | 7/2000 | Kelley et al. | 702/62 |
| 6,327,541 | B1 * | 12/2001 | Pitchford et al. | 702/62 |
| 6,333,975 | B1 * | 12/2001 | Brunn et al. | 379/106.03 |
| 6,396,839 | B1 * | 5/2002 | Ardalan et al. | 370/401 |
| 2003/0158826 | A1 * | 8/2003 | Burke et al. | 705/412 |
| 2003/0171851 | A1 * | 9/2003 | Brickfield et al. | 700/286 |

* cited by examiner

Primary Examiner—Timothy Edwards, Jr.
(74) Attorney, Agent, or Firm—Michael I Kroll

(57) ABSTRACT

A system for managing utility meters via internet. The system includes a central station able to communicate over the internet, and a plurality of meters. The central station includes an intelligent agent. Each meter includes a communication device connectable to the internet and is positioned at a predetermined remote location for monitoring a utility supply to the remote location. The intelligent agent is able to autonomously acquire meter data from each of the plurality of meters over the internet. The plurality of meters are at least one of power, water and gas meters. Each of the meters have a unique Universal Resource Locator and the intelligent agent is able to display data acquired from said meter in a desired format. The meters may each include a receiver for receiving data from the intelligent agent, communication between the intelligent agent and meter being bi-directional. The central station also includes a load forecasting agent able to predict an amount of power used at the remote locations based upon data acquired by the intelligent agent. The intelligent agent and load forecasting agent are able to optimize operation of the meters and supply of a utility to the remote location via the meters.

13 Claims, 7 Drawing Sheets

POWERBOT-A NOVEL ENERGY MANAGEMENT TOOL

METHOD AND SYSTEM FOR ENERGY MANAGEMENT USING INTELLIGENT AGENTS OVER THE INTERNET

REFERENCE TO RELATED APPLICATIONS

This is a non-provisional application claiming priority from U.S. Provisional Application Ser. Nos. 60/141,529 filed Jun. 25, 1999; 60/161,998 filed Oct. 28, 1999; 60/258, 634 filed Dec. 29, 2000; 60/466,350 filed Apr. 29, 2003; 60/469,484 filed May 9, 2003 and Disclosure Document Nos. DD/466,350 and DD/469,484.

BACKGROUND OF THE INVENTION

1. Field of the Invention

The present invention relates generally to a process of energy management and, more particularly, to a process and apparatus for enabling energy industries to effectively manage their operations via the use of intelligent programming agents, also called programming robots or "bots", for autonomously performing tasks such as collecting information from utility meters, detecting operating problems and analyze data collected from the utility meters on behalf of the user over the Internet or some other computer network, within the framework of the energy or utility industry operations. These intelligent agents can be mobile, e.g. they roam the Internet or a system of computers, or they can be fixed. The agents are written in a high-level computer language and are set up to operate across many different computer platforms.

2. Description of the Prior Art

There are 265,000,000 existing utility meters, e.g. electric, gas and water, using the Transmission Control Program/Internet Protocol (TCP/IP) program as nodes on the internet with their own universal resource locator (URL) or Internet Protocol (IP) address. Reading of the electric meter has been a major function of the utility company since this is the only real physical connection with the customer and it is the major revenue source for the utility and provides a security of supply and the orderly availability of electric power. There is an entire allied industry specializing in meter reading and meter reading tools. Meter reading and meter service accounting has been literally a "chore" for these companies and they have tried many ways to improve this function, these have historically included:

1) Drive-by readers where the specially fitted meter transmitter sends out a radio signal which a truck picks up with a special receiver;
2) Radio frequency metering which includes a broadcast from the meter to a central station on a low power system;
3) Cellular and wireless systems, which read the meter, transmitted signal over the wireless network; and
4) Powerline carrier systems like the Turtle or TWACS system which send a signal down the transmission power line back to the utility.

Several applications of energy management exist today at various levels of sophistication and at different levels of operation from a single building to a whole utility system. Operationally, they vary from manually controlled systems which physically read and tabulate the electric power use in buildings and at enduser sites to fully interactive computer controlled systems that have massive amounts of dedicated computer resources interacting with the meters and sensors at a given site. The latter are large complex systems that cost hundreds of thousands of dollars and must be manned by a staff of real-time technicians. At the utility level, energy management is basically load forecasting. Load forecasting is a necessary part of resource management for these power generating companies. The better the load forecasts the more efficiently can the resources of the utility be configured to minimize operating costs.

Load forecasting which is critical to efficient allocation of utility resources has been utilized by several utilities using various algorithmic processes with historical data, but to date, none have used the ubiquitous nature of the internet to leverage the knowledge of their customer base to optimize forecasting and thereby minimize fuel use, their greatest cost center. None of these systems have any rudimentary attempts of intelligent agent use. Some of the current load forecasting approaches use fuzzy logic, regression and neural networks to develop forecasts.

The present invention can integrate all the current computational functions along with real time Internet derived data into a cohesive whole that runs on computer servers and uses the Internet as the basic communication backbone. By integrating the historical data and the accepted technologies with our real time information the present invention provides, a more realistic load forecast for resource allocation and optimization can be developed. The method of the present invention allows for 1-hour, 24-hour and 120-hour load forecasts by the utility. The present invention allows for a forward looking energy assessment (FLEA) to be made and updated continuously as part of the normal operating practices of the utility or power generator/provider.

The use of intelligent agents in the energy management and power generation industries has not been attempted because of the inherent nature of the industry in the past. Most power companies have been regulated utility operations with a preset and known rate of return provided by the regulatory agencies that oversee these entities and there was no need to innovate. Today with the looming deregulation in most states and by Federal mandate these companies have to be economically competitive and more cost conscious. To meet this need, various approaches have been attempted to outsource operations and use more modern approaches for operations but in general there has been no major shift internally in these companies. The use of intelligent agents has been focused in other areas not related to energy and power generation. U.S. Pat. No. 5,920,848 shows the use of intelligent agents in financial transactions and accounting. Similarly, U.S. Pat. No. 5,983,200 uses an intelligent agent to perform delegated tasks. U.S. Pat. No. 5,926,798 uses agents in on kine commerce on the Internet. U.S. Pat. No. 5,664,202 intelligently monitors power consumption with a set of computer software modules. None of these approaches have focused on the use addressed by the subject invention, e.g. the energy generation and distribution industry.

SUMMARY OF THE PRESENT INVENTION

The present invention relates generally to a process of energy management and, more particularly, to a process and apparatus for enabling energy industries to effectively manage their operations via the use of intelligent programming agents, also called programming robots or "bots", for autonomously performing tasks such as collecting information from meters, detecting operating problems and analyzing data collected from the meters on behalf of the user over the Internet or some other computer network, within the framework of the energy industry operations. These intelligent agents can be mobile, e.g. they roam the Internet or a system of computers, or they can be fixed. The agents are written in a high-level computer language and are set up to operate across many different computer platforms.

A primary object of the present invention is to provide a method and system for managing a utility that will overcome the shortcomings of prior art devices.

Another object of the present invention is to provide a method and system for managing a utility whereby the management of the utility can be effected in an economic and automatic fashion over the Internet.

A further object of the present invention is to provide a method and system for managing a utility via the internet which allows the development of an economical automatic energy management system which uses the existing internet as the communications media and internet communication can be achieved by any of the existing modes in use like the telephone, fiber optic cable, power line carrier, wireless or satellite.

A still further object of the present invention is to provide a method and system for managing a utility via the internet including multiple types of intelligent agents which are able to operate autonomously, and can communicate with each other for collecting data from utility meters, analyze the collected data and determine a status of a meter site.

An even further object of the present invention is to provide a method and system for managing a utility via the internet wherein the agents are able to perform any number of tasks which are normally accomplished by centralized programs or manually by their human equivalent.

A still further object of the present invention is to provide a method and system for managing a utility wherein the method is a multi-agent application that involves distributed computation or communication between components.

A yet further object of the present invention is to provide a method and system for managing a utility which can be effectively used in applications that can be coupled to the Internet.

Another object of the present invention is to provide a method and system for managing a utility which is suited for applications that require distributed, concurrent processing capabilities.

An even further object of the present invention is to provide a method and system for managing a utility including mobile agents which require little centralized communication and do not create performance bottlenecks.

A yet further object of the present invention is to provide a method and system for managing a utility via the internet that is simple and easy to use.

A still further object of the present invention is to provide a method and system for managing a utility via the internet that is economical in cost, more sophisticated and more dependable than the conventional methods and apparatuses.

Additional objects of the present invention will appear as the description proceeds.

A system for managing utility meters via internet is disclosed by the present invention. The system includes a central station able to communicate over the internet, and a plurality of meters. The central station includes an intelligent agent. Each meter includes a communication device connectable to the internet and is positioned at a predetermined remote location for monitoring a utility supply to the remote location. The intelligent agent is able to autonomously acquire meter data from each of the plurality of meters over the internet. The plurality of meters are at least one of power, water and gas meters. Each of the meters have a unique Universal Resource Locator and the intelligent agent is able to display data acquired from said meter in a desired format.

The meters may each include a receiver for receiving data from the intelligent agent, communication between the intelligent agent and meter being bi-directional. The central station also includes a load forecasting agent able to predict an amount of power used at the remote locations based upon data acquired by the intelligent agent. The intelligent agent and load forecasting agent are able to optimize operation of the meters and supply of a utility to the remote location via the meters.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Turning now descriptively to the drawings, in which similar reference characters denote similar elements throughout the several views, the Figures illustrate the method and system for managing a utility via the internet of the present invention. With regard to the reference numerals used, the following numbering is used throughout the various drawing figures.

10 method and system for managing a utility via the internet
12 physical environment
14 computational environment
16 Internet
18 electric power meter
20 web pages
22 individual universal resource locators
24 intelligent agents
26 user computer 28 residential devices
30 commercial devices
32 industrial devices
34 energy users or consumers
36 Starfish devices
38 pulse reader
40 gas encoder
42 gas meter
44 water encoder
45 water meter
46 computer or group of computers
48 connections
50 substation
52 communications links
54 types of load forecasts
56 database
58 load forecaster computer models
60 climatic and weather data
62 Forward Looking Energy Assessment models
64 power and fuel delivery
66 fuel sources
68 power users

DETAILED DESCRIPTION OF THE
PREFERRED EMBODIMENT

Turning now descriptively to the drawings, in which similar reference characters denote similar elements throughout the several views, FIGS. 1 through 7 illustrate the method and system for managing a utility via the internet of the present invention indicated generally by the numeral 10.

As will be described hereinafter, the method and system for managing a utility via the internet of the present invention 10 uses programming robots or intelligent agents for communicating with utility meters such as energy, water and gas meters, which appear as fully functional websites. Intelligent agents or "bots" as disclosed by the present invention can interact in a two-way mode with the utility meters, which have their own universal resource label (URL) or Internet address. By using this technology, data is accessed and can be transferred bi-directionally using these intelligent agents. The data forms the basis for energy management and operational decision-making by the utility.

Figure 1:
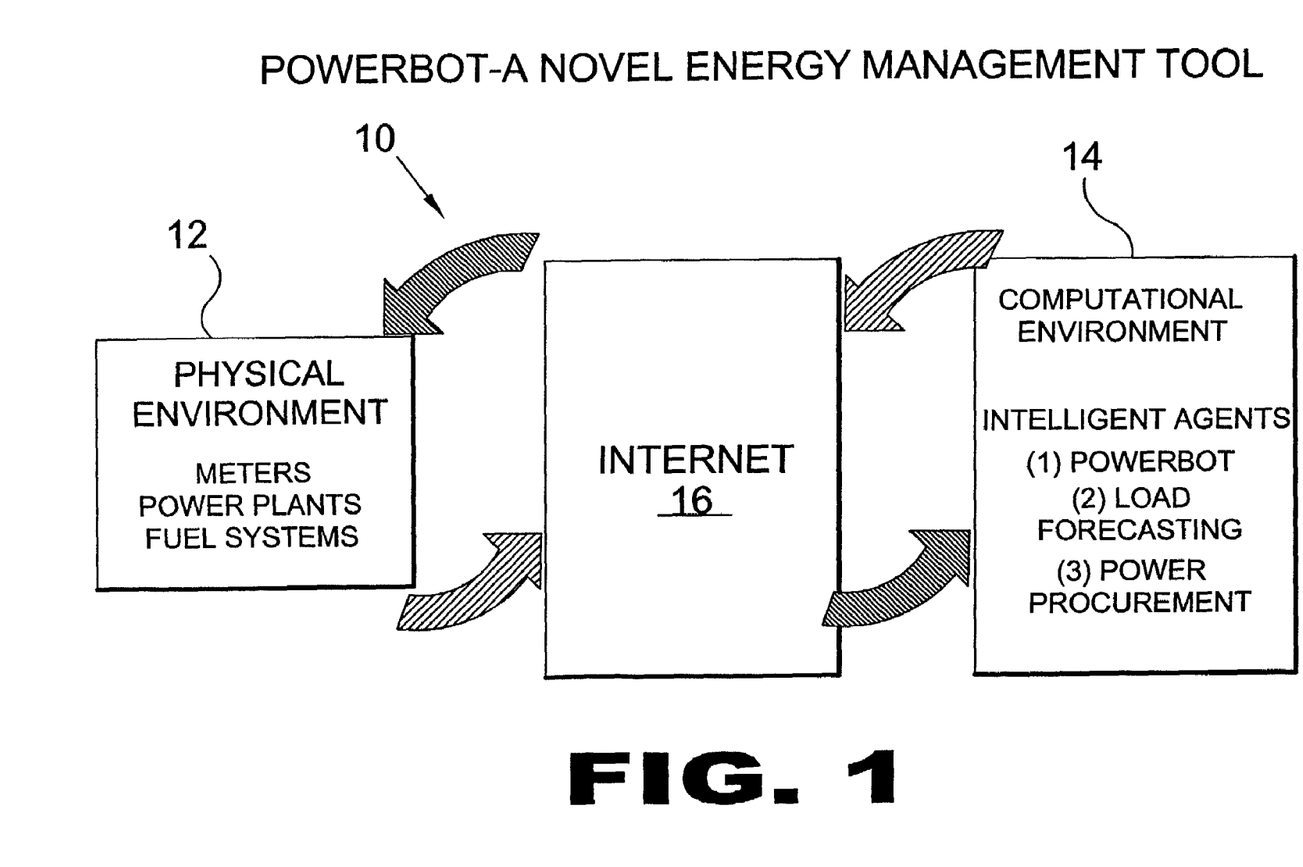
FIG. 1 is a block diagram of the operational environment of the system for managing a utility via the internet of the present invention.
Figure 2:
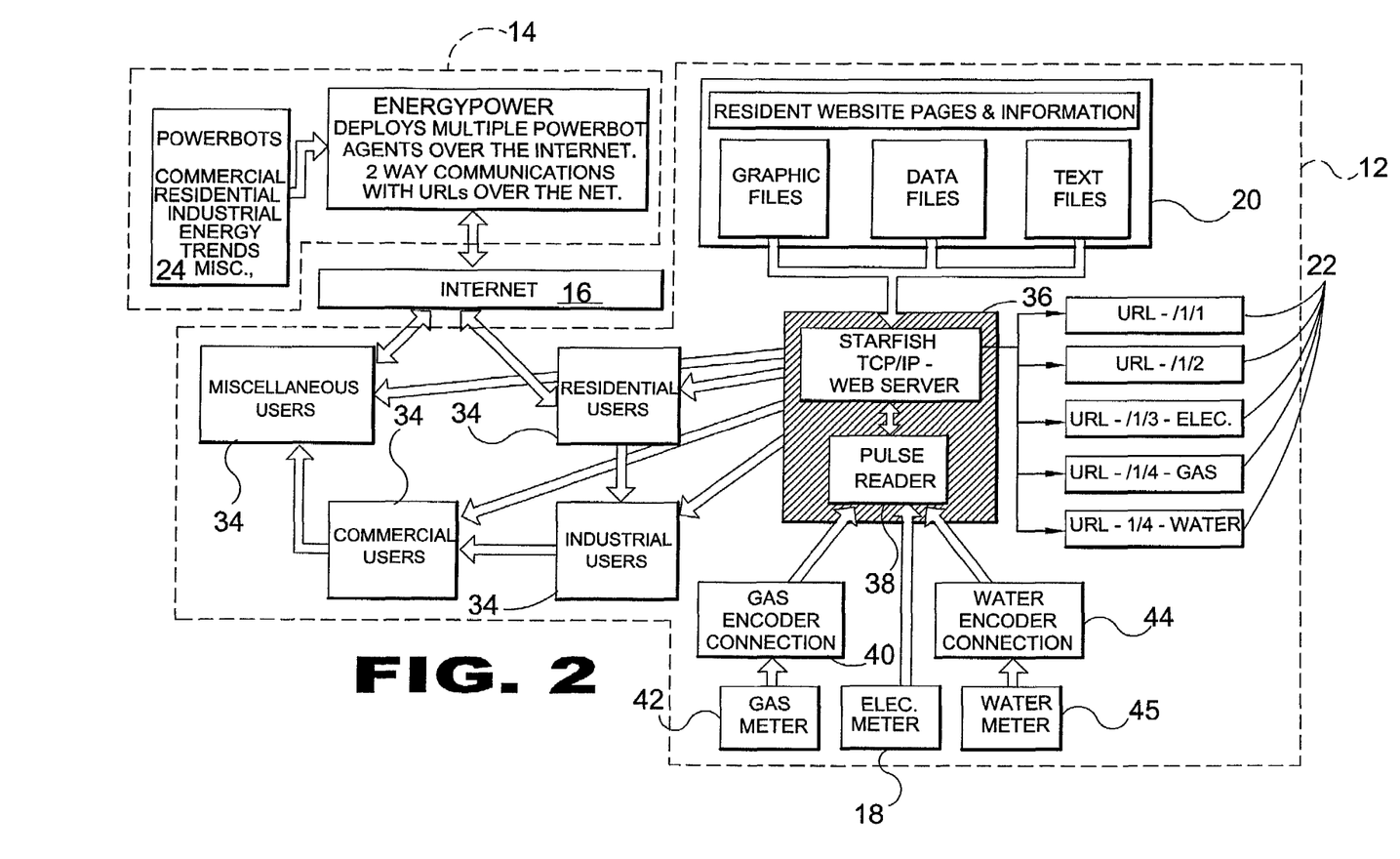
FIG. 2 is block diagram of the system for managing a utility via the internet of the present invention.
Figure 3:
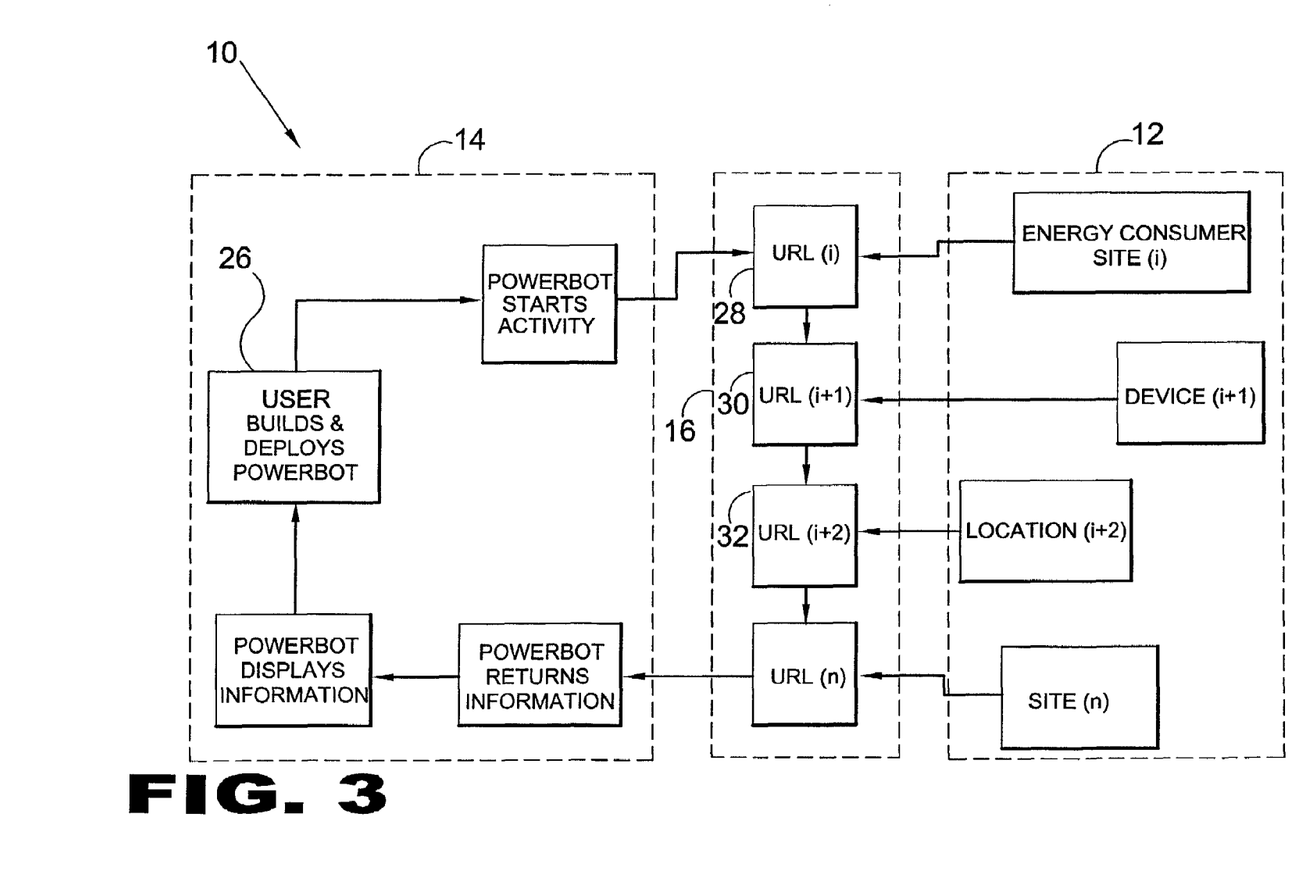
FIG. 3 is a block diagram illustrating an intelligent agent being used in the system for managing a utility via the internet of the present invention.
Figure 4:
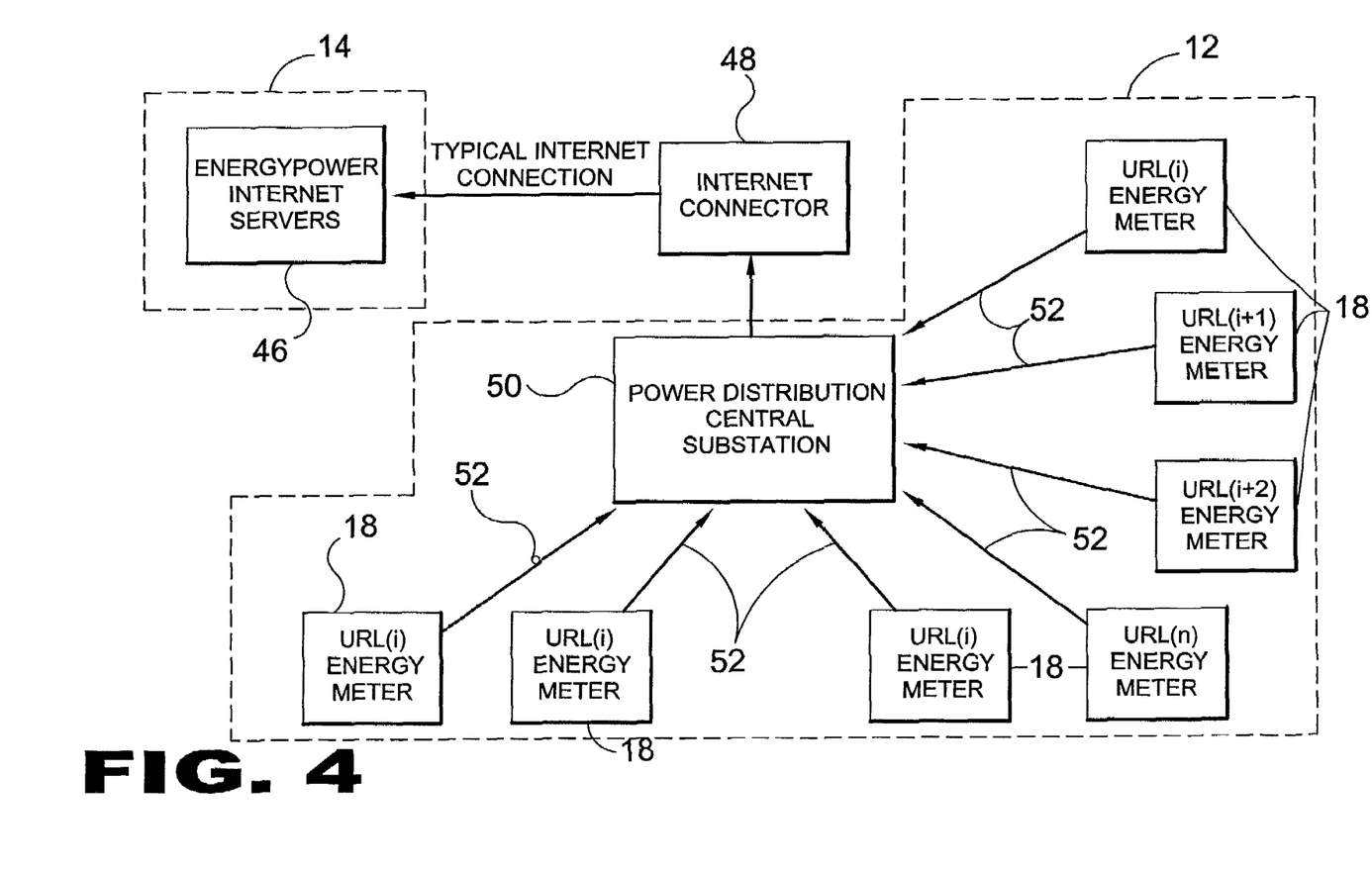
FIG. 4 is a block diagram illustrating the internet connections for the power meters of the apparatus for managing a utility via the internet of the present invention.
Figure 5:
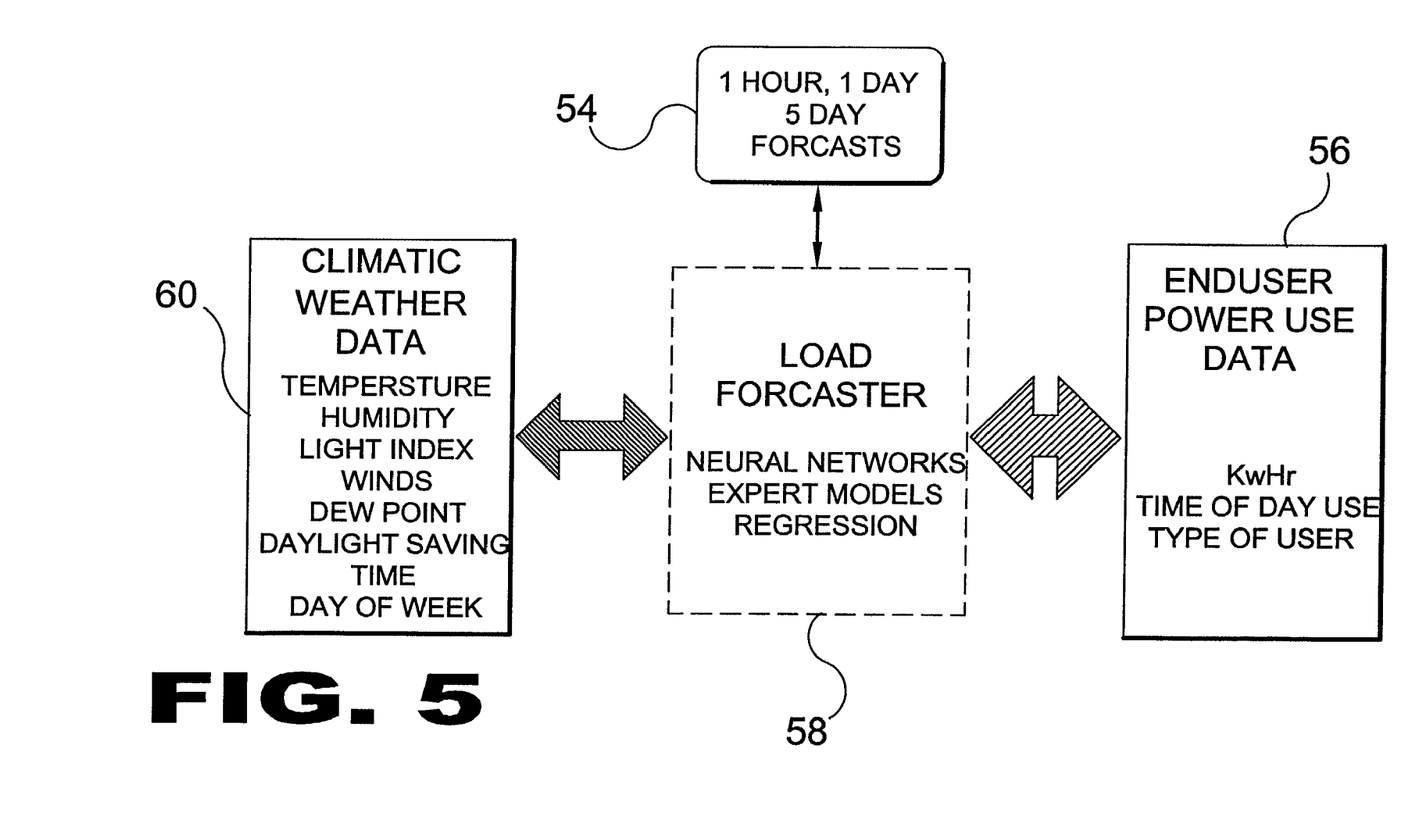
FIG. 5 is a block diagram of the computational environment of the system for managing a utility via the internet of the present invention.

As shown in FIG. 1 the operational environment of the method and system for managing a utility via the internet of the present invention 10 consists of the physical environment 12 and the computational environment 14 connected by the Internet 16. The operational environment, as shown in FIGS. 2, 3 and 4, consist of the energy management system at a minimum consisting of a set of energy reading and recording devices or meters which provide the basic input data and information and the power generation system consisting of generators and their fuel supply. For purposes of the present invention the meters are usually electric power, gas and water meters. The computational environment 14 is shown in FIG. 5. It consists of intelligent agents and algorithmic processes usually regression or neural networks 58 that use the data from the physical environment 12 to optimize the computational environment.

Each physical endpoint location will have the central meter point usually at the electric power meter 18 as shown in FIG. 2. The electric power meter 18 is converted to behave as an addressable TCP/IP website at which the data is available as web pages 20 which can have individual universal resource locators 22. The URL's 22 provide for individualized location and the capacity for interaction with intelligent agents 24. The data available at the web pages 20 can be in any machine-readable or web enabled form and is not limited to the types shown here in the disclosed embodiment.

The user builds an intelligent agent program from available programming platforms. The programming platforms are available from several existing methodologies and high-level languages. Several examples such as INFOSLEUTH, AGENTSERVER™ and AGENTBUILDER™ exist. The agent 24 has the logic and programming instructions to meet the requests of the user. In this case, the agent 24 is programmed to deploy itself over the Internet 16 and locate and read data from each of the energy meter 18 web page sites 20 in its programmed list. Application of the present invention is not limited to the sole application described herein. However, the example of application provided herein provides an indication as to what type of tasks can be performed by the application of the intelligent agent as provided for in the present invention.

As shown in FIG. 3, the agent or "bot" 24 is deployed from the user computer 26 via the internet 16 and circulates through the system 10 going from energy device to energy device 34, the energy devices 34 may be residential 28, commercial 30, industrial 32 devices, performing the functions dictated by the user as is illustrated in FIG. 2. The agent or bot 24 returns the information requested by the user computer 26 and can then communicate with the user 26 and other agents 24 to perform additional tasks needed to complete management of the system 10. The data compiled by the intelligent agents 24 is input into a load forecasting program 58 as shown in FIG. 5 to provide future power forecasting ranging from short term one hour forecast to mid term e.g. 5 day forecasting to as much as 30 day forecasting for power use.

The physical environment 12 involves the collection of meters, power plants and fuel systems that make up the tangible assets of the power company. The Internet 16 and world wide web consist of interconnected computers that are all addressable worldwide using the TCP/IP and FTP or other publicly available communications protocols. The energy users or consumers 34 are one of the major beneficiaries of this new technology and each entity in this group may have one or more measuring sites for electric power monitoring. A Starfish device 36 is a major innovation included in the present invention and is also the subject of a patent application by the same inventor. The Starfish device 36 can be fitted to new meters or retrofitted to older existing meters to allow the meter to be addressable via the Internet. A pulse reader 38 is an optical or similar sensor that is readily available in the industry and allows the dumb meter 18 to be connected to the Starfish device 36 thereby communicating actual KwHr or other readings to the Starfish device 36. A gas encoder connection 40 is connected between a gas meter 42 and the starfish device 36 for allowing the gas meter 42 to communicate with the Starfish device 36. A water encoder 44 is a similar connector device connected between a water meter 46 and the starfish device 36.

The information developed and prepared by the Starfish device 36 is made available in web enabled format as pages 20 and reside on the web pages 46 of the Starfish device 36. The URL or universal resource locator number or description 22 is the unique computer notation for each Starfish device 36. This unique URL 22 makes the Starfish device 36 addressable and reachable over the Internet 16. The intelligent agents or PowerBOTs 24 are the subject elements of the system 10 of the present invention. These PowerBots 24 are launched from a computer or group of computers 46 to roam the Internet 16 and interrogate the Starfish devices 36. The Starfish devices 36 are all connected to the Internet 16 by connections 48, which can be any of the available telecom, wireless, fiber-optic or satellite means of communication standard in the industry. The central power station or its substation 50 is the last major point of power distribution in the power grid. The energy meters 18 are connected to the substation 50 by communications links 52.

As shown in FIG. 5, the types of load forecasts 54 depict the time intervals over which the user wishes to predict its power use. It is a standard industry practice to predict at 1-hour, 1-Day, and 5-Day time horizons. The historical and real time data is held in a database 56, which can be any typical industry type such as ORACLE or ACCESS that are basic industry tools. The load forecaster computer models 58 are complex algorithmic models programmed to mimic the behavior and performance of these utility systems.

Figure 6:
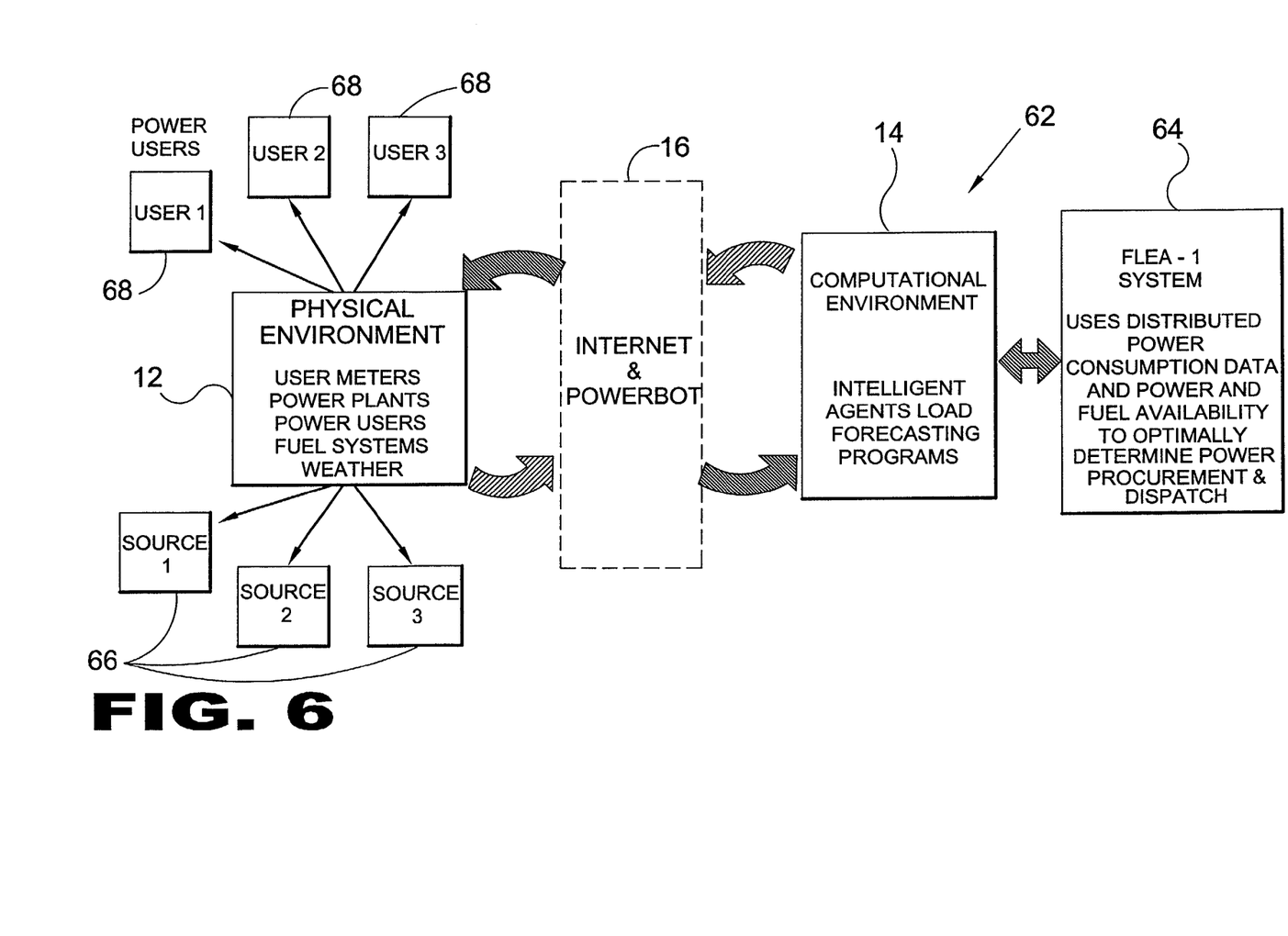
FIG. 6 is a block diagram illustrating the Forward Looking Energy Assessment model system connections of the system for managing a utility via the internet of the present invention.
Figure 7:
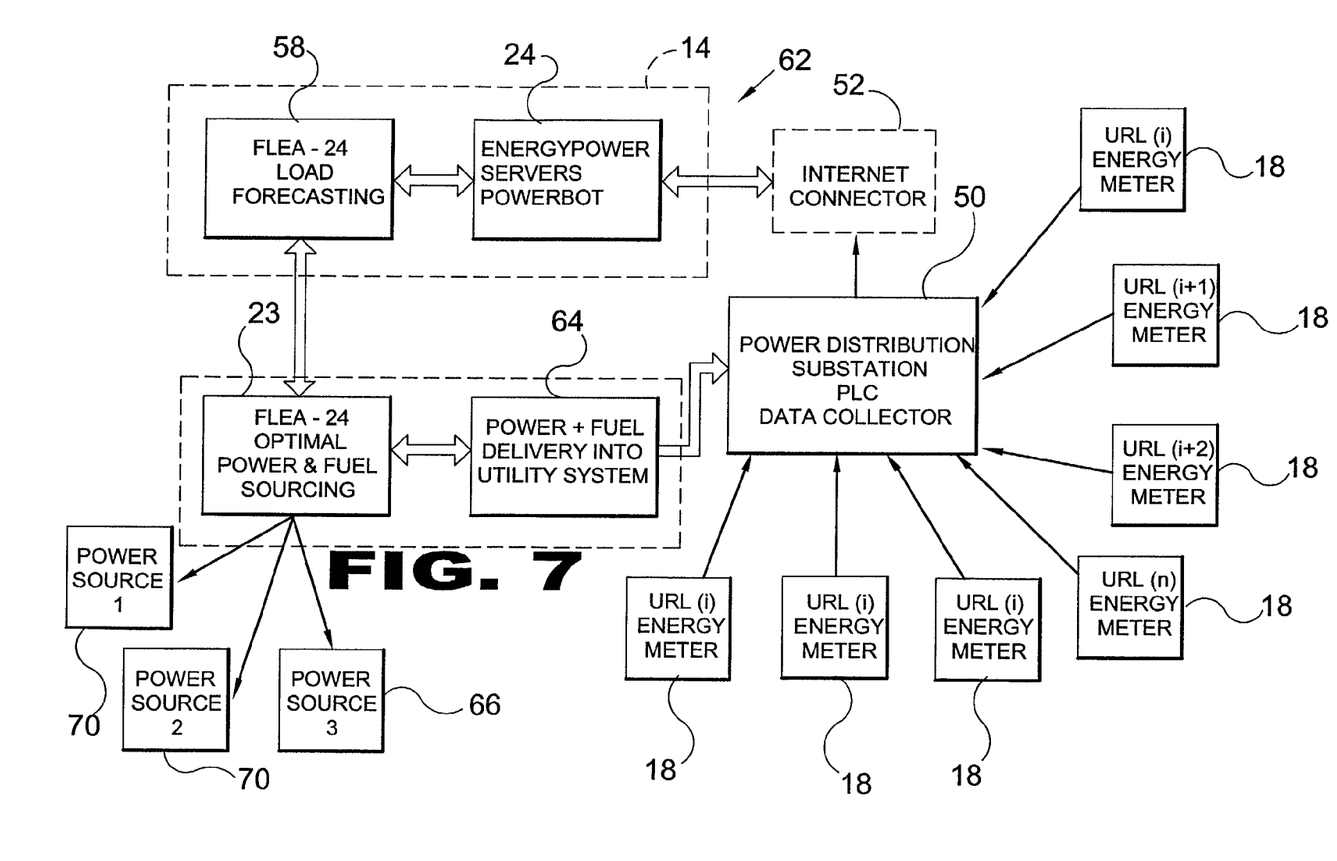
FIG. 7 is a block diagram illustrating the system operation of the system for managing a utility via the internet of the present invention.

The climatic and weather data 60 is a separate database utilized in forecasting. The Forward Looking Energy Assessment models 62 as shown in FIGS. 6 and 7 are combinations of decision making programs that allow the user to evaluate the needs for energy and couple these needs to fuel needs and energy procurement decisions. The operational fuel and power models 64 allow the utility to determine fuel consumption. The fuel sources 66 are third party commercial sources of available fuel like natural gas, coal, petroleum liquids and power generating fuels. The computational environment 14 is the total interacting system of computers that include the user's servers, the public Internet computers and the utility's machines that interact. The computational environment 14 includes the intelligent agents 24 and the load forecasters 58. The power sources available to the user 68 and the fuel sources 66 are a major part of the energy industry developed and deployed to meet energy demand nationally.

The operation of the system 10 will now be described with reference to the figures. On a daily or required time basis the agent(s) are deployed by the user onto the internet. The user either provides the agent with a set of rules governing its destination locations or allows the agent to use its programmed intelligence to perform its tasks. The agent returns with the requested data and the user performs the additional analysis needed to determine energy usage. Load forecasting is then made in a conventional manner.

The process followed by the system of the present invention requires the following:
 (1) POWERBOT™, e.g. a set of agents that read the power use data from distributed meter websites at enduser locations via the Internet
 (2) A load-forecasting program that utilizes the power consumed database provided by the POWBRBOT™ application to forecast the power needs in the future.
 (3) An interface that allows the user to easily and seamlessly utilize the integrated programs interactively by a browser or similar type computing environment in a batch mode or continuously.
 (4) A procurement program that uses intelligent agents to optimally procure the forecasted electric power from online suppliers in the market place.

Process Description:

The process is carried out according to the following steps:
 1) The PowerBOT 24 is an intelligent software system of one or more agents, which carry out tasks on behalf of the developer. These tasks may be carried out autonomously once delegated. The PowerBOT 24 behaves much like an Internet search engine, or Internet spider. The Internet search engine is not a new concept as there are several applications of these systems for online auctions, bidding strategies and financial and text searches on the Internet 16. However, in method and system of the present invention the PowerBOT 24 is provided a set of locations in its instruction set. The set of locations are Internet nodes of the electric power meters 18 or Starfish device 36 sites that are to be read and monitored. In addition to reading the site 36 PowerBOT 24 can also update the site information by acting in a two-way mode. The PowerBOT 24 technology is part of the present invention and relates to the novel technology of using an intelligent software agent to bi-directionally interface with power and energy meters 18 or similar metering devices that are connected to the internet and world wide web or intranet system with appropriate TCP/IP addresses. The PowerBOT 24 is written in any of several languages and can take any of several formats. The PowerBOT 24 returns the required data to the computer servers. This information is processed further by the energy management system.

2) The load-forecasting program 58 is a necessary part of resource management for power generating or power providing companies. Today and in the past, the load forecasts have been made using regression programs, fuzzy logic and neural networks. If the forecasts are too high the generator will have to put online more than the required amount of power. This results in an attendant waste in fuel and operating costs. If the forecasts are too low a shortfall in power results and the generator encounters the opposite problem of buying expensive power from outside parties or having certain groups curtail their power use. Either approach is an expensive proposition for the power provider. Usually the load forecasts are predicated daily or twice daily depending on company practice. The companies combine customer historical data, weather data 60 and day of the week data to predict their load factors. In some more elaborate scenarios the load forecast 54 is predicted for 1-hour, 1-day and 5-days ahead. The invention herein described allows for all 3 types of predictions to be made in addition to any pre-determined time horizon.

3) Power procurement after load forecasting is the continued novel use of the intelligent agents in this invention. There are several approaches to procuring power from multiple sources of supply. Utilities have developed online systems showing their available power sources (25) that include the NYMEX and other exchanges to buy and sell electric power. Several systems are currently implemented on the Internet. The Federal Government has provided for a public nationwide system called "OASIS" (Ref. 11) to provide the power sales data to all consumers. This invention carries the system one step further by seamlessly integrating the procurement process by allowing the intelligent load forecasting agents that derive the load forecasting data to work directly with the power procurement agents described in this invention that seek the available sources and supplies to provide the optimal power combination directly to the enduser on his computer screen as a prioritized list of available power sources.

The load-forecasting model is not a part of this invention since these models have been in widespread use around the world. However, the integration of internet derived data from PowerBots 24 or intelligent agents into these load forecasting models, is a new and efficient manner of obtaining and integrating real time customer data into the over all load forecast model. The integration of the PowerBOT 24 agents into the load forecasting produces a load forecast agent system which allows forward looking energy assessment 58 to be accomplished. The final output is a novel and improved technology, which provides for more realistic energy assessments and forecasts for the utility. A secondary benefit is that data points and some parameters that do not contributing to the overall load forecast in a significant manner. These parameters and data points can be dropped from the models. By using these intelligent agents the forecaster can optimize the operational process to omit these parameters and data points and by so doing obtain a more efficient model of the forecasting process. This model will run quicker and provide forecasts with less input data and thus provide for better resource planning and allocation.

Browsers are the graphic interfaces that have been developed to facilitate and optimize individual use of the Internet and the World Wide Web. Browsers simplify the workload and as such have been accepted as an integral part of the computing desktop. The load forecasting and PowerBOT 24 programs are integrated and combined to provide a common browser interface such that a common basis exists for users.

From the above description it can be seen that the method and system of the present invention is able to overcome the shortcomings of prior art devices by providing a method and system whereby the management of a utility can be effected in an economic and automatic fashion over the Internet. The method and system for managing a utility via the internet allows the development of an economical automatic energy management system which uses the existing internet as the communications media and internet communication can be achieved by any of the existing modes in use like the telephone, fiber optic cable, power line carrier, wireless or satellite. The method and system includes multiple types of intelligent agents which are able to operate autonomously, and can communicate with each other for collecting data from utility meters, analyze the collected data and determine a status of a meter site wherein the agents are able to perform any number of tasks which are normally accomplished by centralized programs or manually by their human equivalent.

The method and system for managing a utility is a multi-agent application that involves distributed computation or communication between components, can be effectively used in applications that can be coupled to the Internet and is suited for applications that require distributed, concurrent processing capabilities. The method and system for managing a utility including mobile agents requires little centralized communication and do not create performance bottlenecks. Furthermore, the method and system of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A system for managing utility meters via internet, said system comprising:
   a) a central station able to communicate over the internet, said central station including an intelligent agent; and
   b) a meter positioned at a remote location for monitoring a utility supply to the remote location, said meter including a communication device connectable to the internet, wherein said intelligent agent able to autonomously acquire meter data from said meter over the internet thereby allowing said central station to determine an amount of usage of the utility, wherein said meter includes at least one of a power meter, a water meter and a gas meter, said intelligent agent acquiring data from any combination of said power meter, water meter and gas meter; said power meter, water meter and gas meter each have a unique Universal Resource Locator; said central station also includes a load forecasting agent able to predict an amount of power used at said remote location based upon data acquired by said intelligent agent; said intelligent agent and said load forecasting agent are able to optimize operation of said meter and supply of a utility to the remote location via said meter; said intelligent agent and said load forecasting agent are able to predict utility requirements under multiple future time horizons; said multiple future time horizons are from 1 hour to 5 days at any desired time interval; and said central station includes means for adjusting parameters used by said load forecasting agent thereby increasing a speed of operation and increasing prediction accuracy of said load forecaster.

2. The system as recited in claim 1, wherein said intelligent agent acquires data from said meter in real time.

3. The system as recited in claim 1, wherein said intelligent agent is able to acquire data over a high speed internet connection.

4. The system as recited in claim 1, wherein said intelligent agent acquires data at predetermined intervals.

5. The system as recited in claim 1, wherein said meter includes a receiver for receiving data from said intelligent agent, communication between said intelligent agent and said meter being bi-directional.

6. The system as recited in claim 5, wherein said intelligent agent is able to provide data for updating operation of said meter via the internet.

7. The system as recited in claim 1, wherein adjustment of said parameters to an optimum number of values and mix of parameters, said load forecasting agent is able to provide increased mathematical stability for future predictions.

8. The system as recited in claim 1, wherein said intelligent agent is able to display data acquired from said meter in a desired format.

9. The system as recited in claim 8, wherein said central station includes a memory unit for storing said data acquired by said intelligent agent.

10. The system as recited in claim 1, wherein said system includes a plurality of meters, each meter including a communication device connectable to the internet and being positioned at a predetermined remote location for monitoring a utility supply to the remote location wherein said intelligent agent is able to autonomously acquire meter data from each of said plurality of meters over the internet.

11. The system as recited in claim 10, wherein said central station includes a plurality of intelligent agents.

12. The system as recited in claim 11, wherein said plurality of meters are power meters.

13. The system as recited in claim 12, wherein each of said plurality of meters have a unique Universal Resource Locator.

* * * * *